United States Patent
Sato et al.

(10) Patent No.: US 11,753,097 B2
(45) Date of Patent: Sep. 12, 2023

(54) SEAT CUSHION HAVING AN EDGE PORTION, TO BE USED FOR A SEAT OF SADDLE-RIDING VEHICLE, AND MANUFACTURING METHOD THEREOF

(71) Applicant: YAMAHA HATSUDOKI KABUSHIKI KAISHA, Iwata (JP)

(72) Inventors: Hideyoshi Sato, Shizuoka (JP); Tetsuya Mashiko, Shizuoka (JP); Sho Kakuta, Shizuoka (JP); Naoki Kinomoto, Shizuoka (JP); Yusuke Aoyama, Shizuoka (JP); Shigeyuki Ozawa, Shizuoka (JP); Mikito Yokoyama, Osaka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 17/703,464

(22) Filed: Mar. 24, 2022

(65) Prior Publication Data
US 2022/0306228 A1    Sep. 29, 2022

(30) Foreign Application Priority Data
Mar. 25, 2021 (JP) .................. 2021-052396

(51) Int. Cl.
*B62J 1/18* (2006.01)
*B62J 1/00* (2006.01)

(52) U.S. Cl.
CPC .............. *B62J 1/007* (2013.01); *B62J 1/18* (2013.01)

(58) Field of Classification Search
CPC .................... B62J 1/007; B62J 1/26
See application file for complete search history.

(56) References Cited

U.S. PATENT DOCUMENTS 8,516,697 B2 * 8/2013 Akaike ............... B60N 2/5685 29/874
9,456,702 B2 * 10/2016 Miyata ................. A47C 27/14
(Continued)

FOREIGN PATENT DOCUMENTS

JP        08-318066 A    12/1996

OTHER PUBLICATIONS

Toyobo Co., Ltd., "What is BreathAir?", https://www.toyobo-global.com/seihin/breathair/what_breathair.htm, retrieved Mar. 23, 2022, 2 pages.
(Continued)

*Primary Examiner* — Philip F Gabler
(74) *Attorney, Agent, or Firm* — KEATING AND BENNETT, LLP

(57) ABSTRACT

A seat cushion includes an edge portion and a three-dimensional fiber structure including core-sheath fusible fibers and skeletal fibers thermally fused at intersections thereof. The sheaths of the core-sheath fusible fibers are made of a thermoplastic elastomer to fuse the intersections and form a bulging portion at each of the fused intersections. The skeletal fibers and the cores of the core-sheath fusible fibers are made of a non-elastomer resin. The skeletal fibers are crimp-processed bulky fibers, and a fineness of the skeletal fibers and a fineness of the core-sheath fusible fibers are in a range of 1 to 200 dtex. The seat cushion has a layered structure including a plurality of layers fused together, each of the layers has the three-dimensional fiber structure, and the seat cushion has a density distribution based on regional variations of the layered structure and a stiffness distribution that depends on the density distribution.

15 Claims, 5 Drawing Sheets

(56) References Cited

U.S. PATENT DOCUMENTS

| | | | |
|---|---|---|---|
| 10,655,256 B2* | 5/2020 | Dei | D01F 6/92 |
| 11,457,512 B2* | 9/2022 | Wada | H05B 3/56 |
| 2004/0048036 A1* | 3/2004 | Nakasuji | D06N 7/0086 |
| | | | 428/95 |
| 2009/0273222 A1 | 11/2009 | Takei et al. | |
| 2015/0266263 A1* | 9/2015 | Ichikawa | B32B 38/04 |
| | | | 156/92 |

OTHER PUBLICATIONS

Yoshida, "Development of 3D Elastic Fiber Structure 'Elk'" Sen'igakkaishi (Fiber and Industry), vol. 52 No. 12, https://www.jstage.jst.go.jp/article/fiber1944/52/12/52_12_P494/_pdf, 1996, pp. 494-497.

Teijin Frontier Co., Ltd., "elk—Combination Idea, Polyester cusion material", https://www.elk-fiber.net/english/combination/, retrieved Mar. 23, 2022, 4 pages.

\* cited by examiner

SEAT CUSHION HAVING AN EDGE PORTION, TO BE USED FOR A SEAT OF SADDLE-RIDING VEHICLE, AND MANUFACTURING METHOD THEREOF

CROSS-REFERENCE TO RELATED APPLICATION

This application claims the benefit of priority to Japanese Patent Application No. 2021-052396, filed on Mar. 25, 2021. The contents of this application are hereby incorporated by reference herein in their entirety.

BACKGROUND OF THE INVENTION

1. Field of the Invention

The present invention relates to a seat cushion to be used for a seat of a saddle-riding vehicle such as a motorcycle or a personal watercraft (PWC), and a method for manufacturing the seat cushion. More specifically, the present invention relates to a seat cushion having an edge portion provided along at least a portion of a circumferential fringe of the seat cushion. The edge portion defines the fringe, and is typically a portion thinner than other inner regions of the seat cushion, such as a vicinity of a seating area that supports the body weight of an operator/passenger, or is a portion tapering in thickness toward the circumferential fringe.

2. Description of the Related Art

A soft urethane resin foam is generally used for various seat cushions. In urethane resin foams in general, physical properties meeting various requirements would be rather easily realized by optimizing/selecting polyisocyanates and polyols, such as polyether, polyester, and/or polycarbonate, as resin raw materials; and the expansion mold forming conditions.

On the other hand, as cushioning materials, mesh-form three-dimensional cushioning materials made of thermoplastic resins such as polyester are also somewhat used in recent years, and are applied as developed as a seat for trains and bedding (mattresses). Such cushioning materials having three-dimensional structures made of polyester or the like are highly breathable and easy to be reused or recycled. As such cushioning materials, known ones are: the high-performance polyester cushioning material ELK™ of Teijin Frontier Co., Ltd. and BREATHAIR™ of Toyobo Co., Ltd., which has an appearance similar with and thinner and bulkier than instant noodles, and is used in motorcycle seats. ("What is BREATHAIR?", a web page of Toyobo Co., Ltd.; https://www.toyobo-global.com/seihin/breathair/what-_breathair.htm).

On the other hand, Teijin Frontier Co., Ltd.'s high-performance polyester cushion material ELK™ has a three-dimensional structure in the form of thermal bonded non-woven fabric, and has realized an appearance, elasticity, and durability similar to that of a soft urethane resin foam. (Makoto Yoshida "Development of 3D Elastic Fiber Structure 'ELK'" SEN'IGAKKAISHI (Fiber and Industry) Vol. 52, No. 12 (1996); https://www.jstage.jst.go.jp/article/fiber1944/52/12/52_12_P494/_pdf).

Thus, the cushion material ELK™ has been used in bra cups, stroller cushions, bedding cushions, furniture cushions, and the like. The high-performance polyester cushion material ELK™ has a unique three-dimensional structure in which crimp-treated bulky fibers are used and a thermally fusible resin is unevenly distributed as rather concentrated to nodes of intertwining and fusing of the fibers so as to reinforce the nodes. Such a unique three-dimensional structure enables to achieve excellent cushioning and durability.

Further, non-woven fabrics having a vertical orientation of the fibers have been produced by accordion-folding thin sheets of the high-performance polyester cushion material ELK™ ("ELK™" "Combination idea", a website of Teijin Frontier Co., Ltd.; https://www.elk-fiber.net/english/combination/). It has been also attempted to obtain a seat cushion structural body for an automobile seat by stacking such sheet-shaped elastic bodies or non-woven fabrics having a vertical orientation of the fibers, and then heating and compressing them in a mold so as to be fused with each other. (US 2009/0273222 and JP 1996(H08)-318066A).

For scooter-type motorcycles, which are used in short distance city riding (for example, Yamaha Motor Co., Ltd.'s VINO™), the seat cushions of the seats have vertical walls or bulging faces at circumferential fringes, and would, in many cases, not have edge portions. Meanwhile, for motorcycles capable of touring and off-road driving, the seat cushions of the seats mostly have edge portions. Seat cushions for seats of personal watercrafts also mostly have edge portions.

The seat cushion is usually covered with a skin, but the skin is fastened by way of strings or the like to the main body of a saddle-riding vehicle or a lid (support stand) for a room such as an engine room or a storage room. If the seat cushion has an edge portion, the edge portion may be pushed by the skin and thus brought into an inner area of the seat cushion. Therefore, it is necessary to provide a bar of a framework along the circumferential fringe of the seat cushion, or devise a way of fixing the skin and the seat cushion.

Further, it is preferable that the seat cushion has good drainage to some extent. For example, if continually exposed to heavy rain or splashes, water can get in through the seams of the skins or through holes through which strings or threads pass to secure the skin, causing the seat cushion to contain a large amount of water. In such an occurrence, if the drainage property is poor, the seat may be difficult to handle due to an increase in the weight or the like. In particular, when the support base, onto which the seat cushion is attached, has a lid for an engine or storage chamber or the like, it may become difficult to open such a lid.

On the other hand, when trying to obtain a molded body having an edge portion by a method of fusing elastic sheets (sheet-shaped elastic bodies) such as ELK™ to each other to make an elastic molded body as described above, it is expected that the manufacturing process will require considerable ingenuity, and no merit has been found in using such an elastic body in the seat cushion of vehicles. Therefore, since the development of mesh-shaped three-dimensional cushioning materials made of thermoplastic fibers, such as ELK™, no molded product having such an edge portion has been reported. Thus, the present invention can only be achieved through ingenuity in the process, and through discovery of new applications of the mesh-shaped three-dimensional cushioning materials and problems related thereto.

SUMMARY OF THE INVENTION

According to a preferred embodiment of the present invention, a seat cushion for a saddle-riding type vehicle includes an edge portion and a three-dimensional fiber structure including core-sheath fusible fibers and skeletal fibers thermally fused at intersections thereof. The sheaths of the core-sheath fusible fibers are made of a thermoplastic elastomer, which may be a polyester/polyether elastomer or another thermoplastic elastomer. The thermoplastic elastomer is at least partially concentrated to fuse intersections thereof so as to form a bulging portion at each of the fused intersections. The skeletal fibers and cores of the core-sheath fusible fibers are made of a non-elastomer resin, and the skeletal fibers are crimp-processed bulky fibers. A fineness of the skeletal fibers and a fineness of the core-sheath fusible fibers is in a range of 1 to 200 dtex. The seat cushion has a layered structure including a plurality of layers fused with each other, and each of the plurality of layers has the three-dimensional fiber structure. The seat cushion has a density distribution based on regional variations of the layered structure in the seat cushion and a stiffness distribution that depends on the density distribution.

According to a preferred embodiment of the present invention, at least one of the plurality of layers of the layered structure extends up to a circumferential fringe of the seat cushion; and the plurality of layers of the layered structure include a plurality of layers with a vertical orientation in which the fibers are oriented in a thickness direction. Further, according to a preferred embodiment of the present invention, the edge portion is provided along at least a portion of the circumferential fringe of the seat cushion, and a thickness of the edge portion is less than that of other regions of the seat cushion, or is tapered toward the circumferential fringe.

According to a preferred embodiment of the present invention, the density and stiffness at the edge portion are higher than those at other areas of the seat cushion, and the other areas of the seat cushion include at least two regions having different densities with respect to each other. According to a preferred embodiment of the present invention, the edge portion has a density of more than 40 kg/m³ or more than 50 kg/m³ and defines a shape-retaining framework for the seat cushion. Further, according to a preferred embodiment of the present invention, the density at regions other than the edge portion is in a range of 20 to 35 kg/m.

According to a preferred embodiment of the present invention, a method of manufacturing a seat cushion to be used for saddle-riding vehicle seats includes preparing skeletal fibers as bulky fibers by crimp processing fibers made of a non-elastomer resin, and preparing core-sheath fusible fibers by covering core fibers made of a non-elastomer resin with a thermoplastic elastomer, which may be a polyester/polyether elastomer or other thermoplastic elastomer; where the skeletal fibers and the elastomeric fibers have fineness in a range of 1 to 200 dtex; preparing an elastic sheet having a three-dimensional fiber structure by mixing staples of the skeletal fibers with staples of the core-sheath fusible fibers and by subsequent heating so that the fibers are fused at their intersections and in which the thermoplastic elastomer is at least partially concentrated at intersections of the fiber so as to form bulging portions at respective ones of the intersections; accordion folding an elastic sheet, to which a vertical orientation of the fibers is not yet provided, and subsequent thermal fusing so as to obtain the elastic sheet having a vertical orientation of the fibers along a thickness direction; and stacking the elastic sheets thus obtained including plural ones having the vertical orientation, and fusing them in a mold set by heating and compressing in the mold set so that the elastic sheets are fused with each other and the seat cushion is shaped along an inner contour of the mold set; and a density distribution based on regional variations of an extent of compression in the mold set and variations in the densities, thicknesses, and stacking number of the elastic sheets, and the number of layered sheets, and a resultant stiffness distribution depends on the density distribution; and wherein the edge portion has a density and a stiffness higher than regions other the edge portions, and at least two regions other than the edge portion have different densities with respect to each other.

According to a preferred embodiment of the present invention, the edge portion of the circumferential fringe may be easily made into a rigid structure without using a separate framework material, and a structure or process for attaching the seat cushion to the saddle-riding vehicle may be simplified. Further, according to a preferred embodiment of the present invention, since it has a unique three-dimensional fine mesh structure, it is possible to provide a cushioning property similar to that of urethane resin foam, particularly body pressure dispersibility, and a good drainage property.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A seat cushion according to a preferred embodiment of the present invention is an integral porous body obtained by stacking and fusing the sheet-shaped elastic bodies (the elastic sheet) of ELK™ in a mold set, as will be described in detail below, and includes edge portions having no reinforcement framework incorporated herein. That is, no reinforcement framework other than the edge portions themselves is embedded at a time the seat cushion is molded, nor is attached on the seat cushion after or during molding of the seat cushion. Such a seat cushion having no reinforcement framework is attached on a support base in a saddle-riding vehicle. Attaching to the support base is achievable by covering the seat cushion with the skin and then fastening the skin to the support base through strings or the like.

To avoid incorporating the reinforcement framework, the edge portions should become rigid at a time the seat cushion is molded in the mold. Specifically, it is possible to increase the densities of the edge portions by measures such as increasing an extent of compression, and/or increasing the number of stacks of the elastic sheets, as compared with other regions. In general, when the density of the sheet-shaped elastic body of ELK™ is increased during molding in a mold, the stiffness is increased substantially proportional to the density. The stiffness of the elastic molded body obtained by fusing the sheet-shaped elastic bodies of ELK™ is able to be evaluated according to JIS K6400-2: 2012 "Soft foam material-Physical properties-Part 2": Hardness and compressive stress—How to determine strain characteristics" by measuring the hardness at 40% constant compression or the hardness at 25% constant compression. Thus, the shape retaining ability of the seat cushion itself superseding the reinforcement framework would be able to be evaluated by the hardness at a time of such constant compression.

As the ELK™ sheet-shaped elastic body (hereinafter, simply referred to as "elastic sheet") used for manufacturing the seat cushion, it is preferable to mainly use the above-described vertical non-woven fabric. In a preferred embodiment, it is possible to partly use the ELK™ elastic sheet before accordion folding, i.e., one having no vertical orientation (orientation in the sheet thickness direction) and to use the elastic sheet having no particular orientation, or having a horizontal orientation with respect to the elastic sheet. Such a sheet-shaped elastic body having no vertical orientation may be arranged only in a vicinity of a region supporting the weight of the operator from below (hereinafter, referred to as "operator's seating area"). In a preferred embodiment, each of the elastic sheets has a substantially uniform thickness and density to facilitate the production process.

Figure 1A:
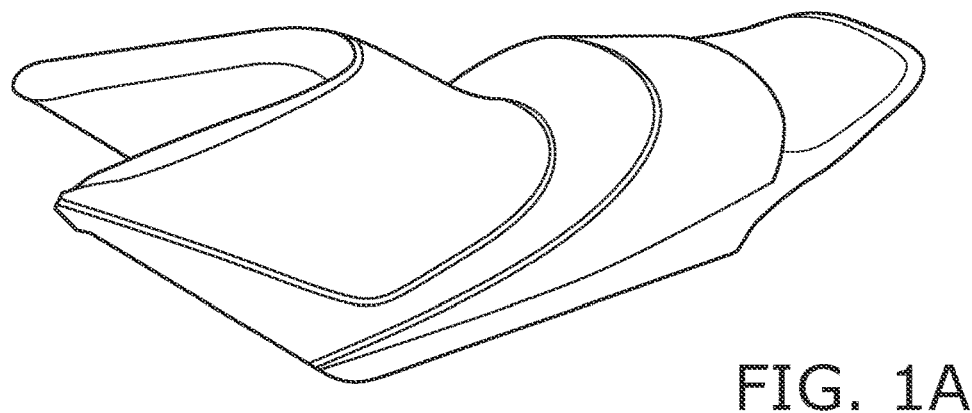
FIG. 1A is a photograph showing an example of a seat cushion with a skin for a two-seater personal watercraft (PWC).
Figure 1B:
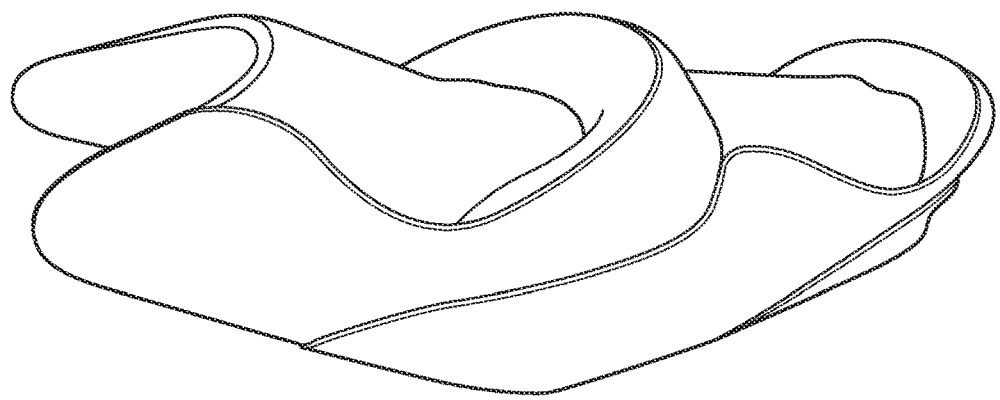
FIG. 1B is a photograph showing another example of a seat cushion with a skin for a three-seater personal watercraft (PWC).
Figure 1C:
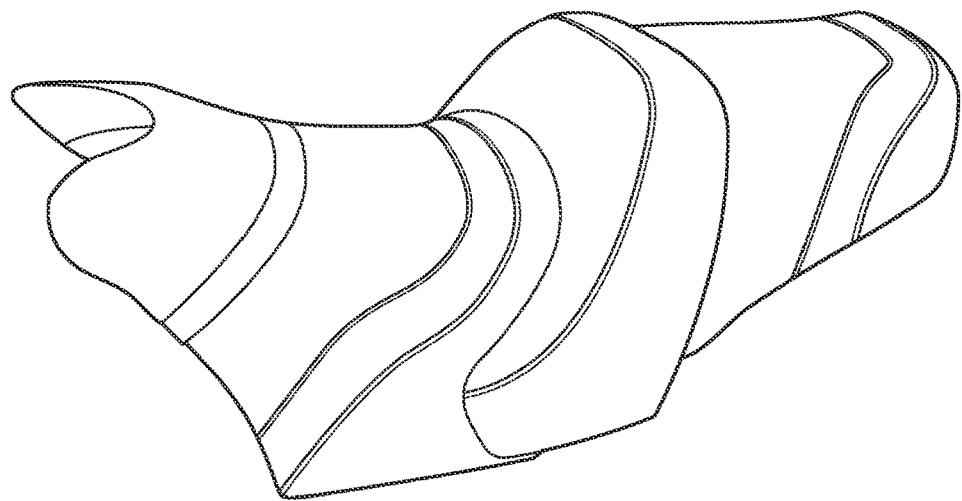
FIG. 1C is an external perspective view showing an example of a seat cushion for a motorcycle with a skin, similar to FIGS. 1A to 1B.

FIGS. 1A to 1C show an example of a seat cushion with a skin. The skin is typically synthetic leather, for example, a nylon or polyester fabric (usually a sheet-shaped knit or woven fabric) coated with a resin layer such as polyurethane. The seat cushions in FIGS. 1A and 1B are used for two-seater and three-seater personal watercraft (PWC), respectively, and the seat cushion in FIG. 1C is used for large motorcycles. The edge portion, which is a peripheral portion having a small thickness, is provided at least in the front portion of the left and right edges, and in particular, is provided in the edge portion that is inclined to upward and forward on the left and right sides. In a preferred embodiment, the edges are provided over the entire perimeter of the seat cushion, i.e., all around. In the seat cushion for a large motorcycle shown in FIG. 1C, the rear sub-passenger seat is separate from the other parts, but this sub-passenger seat also has an inverted U-shaped or C-shaped cross section in the left-right direction and has edges provided on the left and right.

Figure 2A:
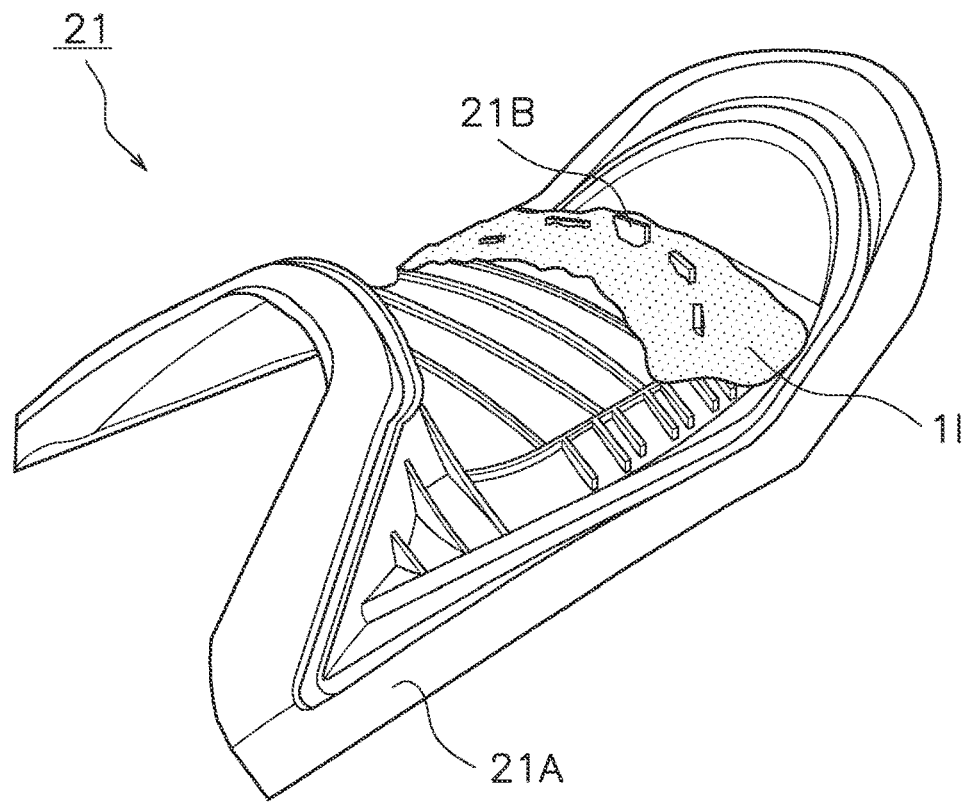
FIG. 2A is a photograph showing an upper mold for molding a lower surface side of a seat cushion.
Figure 2B:
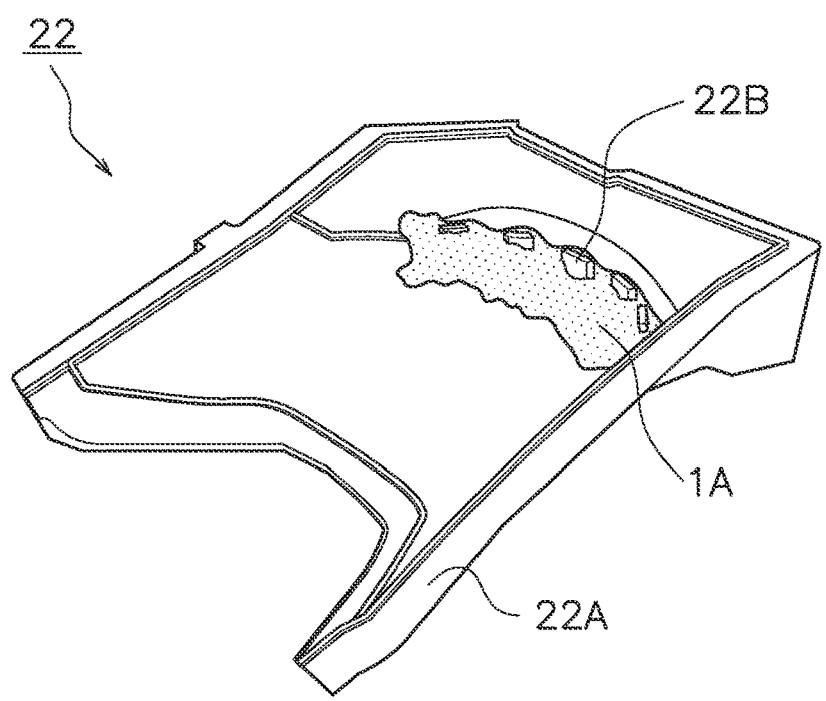
FIG. 2B is a photograph showing a lower mold for molding an upper surface side of a seat cushion.

FIGS. 2A to 2B show an example of upper and lower molds for molding the seat cushion. This set of molds is used to produce a seat cushion similar to the one shown in FIG. 1A. FIG. 2A shows an upper mold for molding the lower surface of the seat cushion, and FIG. 2B shows a lower mold for molding the upper surface of the seat cushion. The lower surface side of the seat cushion of FIG. 1A is almost consistent with mold surface of the upper mold of FIG. 2A.

Figure 3:
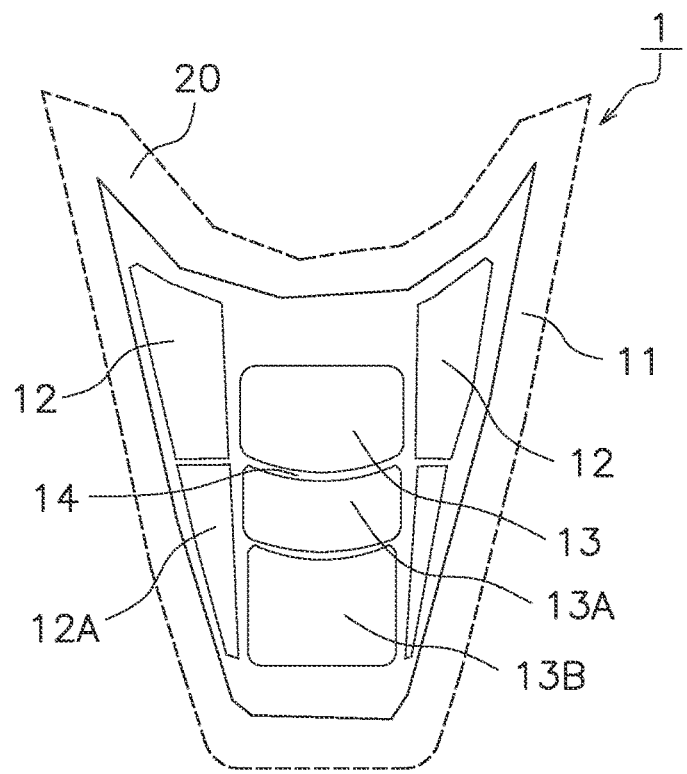
FIG. 3 is a schematic plan view illustrating a plurality of regions of a seat cushion having different densities and stiffnesses in a state in which the seat cushion is flatly spread.

FIG. 3 is a plan view assuming that the seat cushion is spread out in a flat shape, and schematically shows some regions having different densities and stiffness. This example substantially corresponds to the seat cushion of FIG. 1A and the molds of FIGS. 2A to 2B. The edge portions 11 having high density and stiffness are provided over the entire circumferential fringe of the seat cushion 1. In a non-fringe portion or an inner area excluding the edge portions 11, the density and stiffness are relatively high in the operator's seating area 13, which supports the operator's buttocks (particularly near the ischium) from below, and are relatively low in the operator's flank-side areas 12, which sandwich the operator's seating area 13 from the left-hand and right-hand sides. The operator's flank-side area 12 may be an area contacting the thighs and knees of both legs of the operator.

At the rear of the operator's seating area 13, a raised portion 13A is provided to support the operator's buttocks (particularly near the sacrum) from the rear at a time when the personal watercraft (PWC) is suddenly accelerated. At the rear of the raised portion, a passenger's seating area 13B is provided. The raised portion 13A and the passenger's seating area 13B may have a density and a stiffness the same as those of the operator's seating area 13. Further, the density and the stiffness of the rear flank-side areas 12A on the left-hand and right-hand sides of the raised portion 13A and the passenger's seating area 13B may be same as those of the operator's flank-side area 12.

Figure 4A:
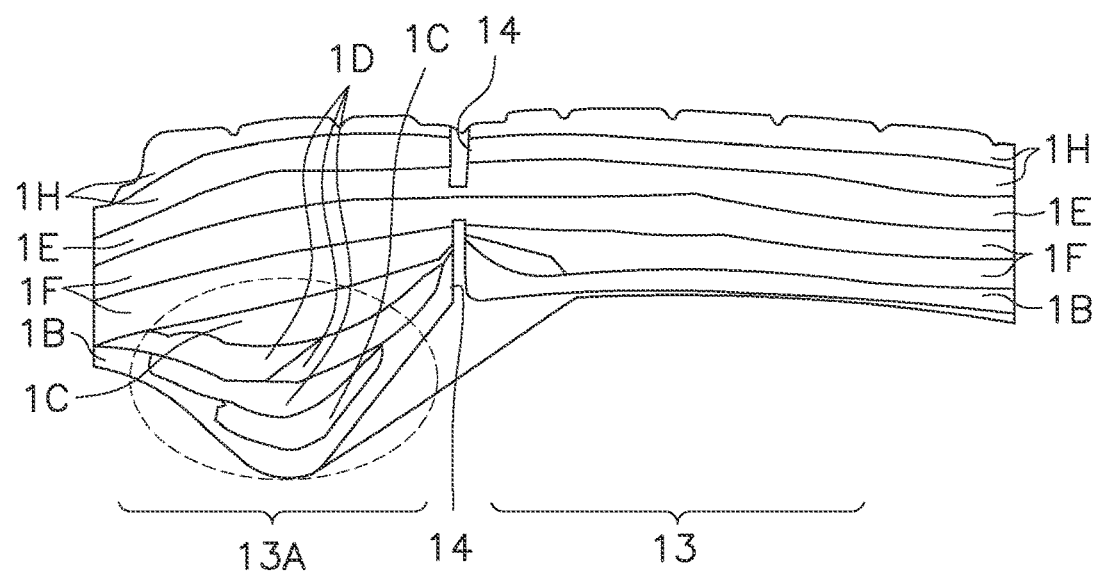
FIG. 4A is a photograph of a cut-through surface showing how the elastic sheets of ELK™ are stacked and fused together, in which the cut is made along front-rear and vertical directions of the seat cushion, and which shows in particular, the seating area for an operator (a portion supporting the operator from below) and the raised portion (an elliptical area) at the rear of the operator's seating area.

FIG. 4A shows a photograph of a vertical cross section of the central portion of the molded seat cushion 1 cut along its center line. In a specific example of FIG. 4A, four to six pieces of the vertical-oriented elastic sheets 1B, 1E, 1F, and 1H are stacked on the operator's seating area 13. Further, in the raised portion 13A at the rear of the operator's seating area 13, seven to ten pieces of the vertical-oriented elastic sheets 1B to 1E, 1F, and 1H are stacked.

In the preferred embodiment shown in FIG. 4A, notches 14 are incised from above and below along a boundary between the operator's seating area 13 and the raised portion 13A. The notches 14 are incised by protrusions 21B and 22B, which protrude from the upper and lower molds 21 and 22 and are shown in FIGS. 2A to 2B. As indicated here, each of the notches 14 has a slit shape and the notches are intermittently arranged in a manner of a broken line, along an arc or an elliptical arc when viewed in a plan view. The notches 14 facilitate providing through holes through which strings for connecting the skin to the seat cushion 1 are passed. Further, the protrusions 21B and 22B protruding from the upper and lower molds 21 and 22 also play a role of preventing the displacement of the elastic sheet during molding.

As indicated in FIGS. 2A to 2B, prior to molding, the elastic sheets 1A and 1I, which are soft and web-shaped, are placed on the molding surface of the upper and lower molds 21 and 22 only in a vicinity of the protrusions 21B and 22B. Such relatively small elastic sheets 1A and 1I are arranged to correspond to a center portion of the seat cushion 1 and are relatively strongly compressed during molding so as to form a hard surface layer. This contributes to prevent the central portions of the adjacent elastic sheets 1H and 1B from being displaced in a horizontal direction in an initial stage of molding and thus from causing a density deviation.

For these elastic sheets 1A and 1I, a non-woven fabric of ELK™ before being accordion folded may be used. Thus, the elastic sheets 1A and 1I, which are arranged so as to become the uppermost layer and the lowermost layer of the seat cushion 1 in a vicinity of the notches 14 of the seat cushion 1, may be (1) not vertically oriented, or (2) smaller in thickness than other ones of the elastic sheets 1B to 1H, which have a vertical orientation and are slab-shaped. These sheet-shaped elastic bodies 1A and 1I having no vertical orientation may not have a horizontal orientation along the sheet surfaces at a time of manufacture, but may come to have a horizontal orientation when compressed.

Figure 4B:
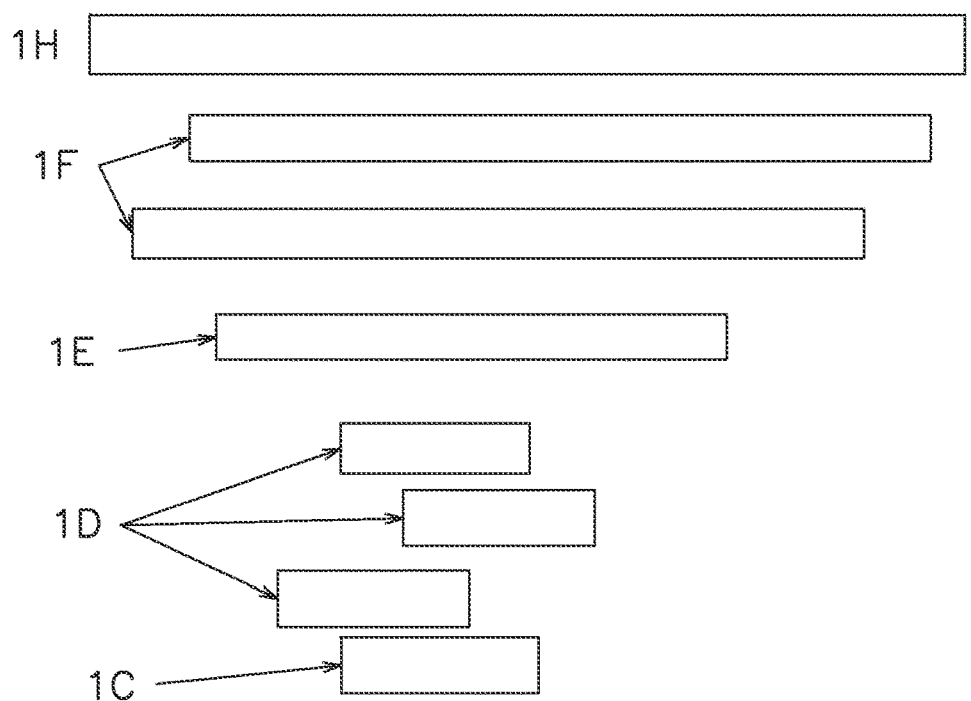
FIG. 4B is a schematic diagram corresponding to FIG. 4A, showing an example how the sheet-shaped elastic bodies of ELK™ are overlapped in a mold so as to form the operator's seating area and the raised portion at the rear.

FIG. 4B shows a detailed example of how the elastic sheets 1C to 1F and 1H are stacked in the center portion of the seat cushion 1. The elastic sheets 1C to 1D are elongated in the left-right direction and are arranged corresponding to the raised portion 13A. Among these, the elastic sheets 1D are arranged only in a center portion in the left-right direction, and in the illustrated example, a plurality of the elastic sheets (for example, two to four sheets) are overlapped in a manner such that fringes extending in the front-rear direction are displaced from each other. The elastic sheet 1C has a larger dimension in the left-right direction than the elastic sheets 1D, and extends leftward and rightward to a vicinity of the left-hand and right-hand side fringes of the seat cushion.

Meanwhile, the elastic sheet 1E also extends leftward and rightward to a vicinity of the left-hand and right-hand side fringes of the seat cushion, and covers from the operator's seating area 13 to the raised portion 13A in the front-rear direction, similarly to the elastic sheet 1C. On the contrary, the elastic sheets 1F extend from a vicinity of the edge portion 11 at a front side of the operator's seating area 13 to a vicinity of the rear fringe of the passenger's seating area 13B. In the illustrated example, a plurality of the elastic sheets 1F are provided (for example, two to three sheets), have the same size and shape, and are arranged so as to be slightly displaced with each other in the front-rear direction. As shown in FIGS. 4A to 4B, between the elastic sheet 1E and the elastic sheets 1F, the stacking order may be swapped and thus the positions in the vertical direction (thickness direction).

The vertical-orientation elastic sheets 1B to 1H are manufactured by accordion folding the thin and highly flexible elastic sheets in an appearance of non-woven fabric, and thus also have an orientation of the fibers along surfaces of the vertical-orientation elastic sheets. In other words, the vertical-orientation elastic sheets have orientations along pleats formed by the accordion folding. The vertical-orientation elastic sheets 1B to 1H may be overlapped such that a horizontal orientation of one of the elastic sheets intersects that of another one of the elastic sheets orthogonally or at an angle not less than about 70°, as needed or appropriate. For example, in FIGS. 4A to 4B, the elastic sheets may be overlapped in a manner such that the elastic sheets 1B, 1F, and 1H have an orientation of the fibers in the front-rear direction of the seat cushion 1 while the elastic sheets 1C to 1E have an orientation of the fibers in the left-right direction of the seat cushion 1. The elastic sheet 1G described below may have an orientation of the fibers in a length direction of the elastic sheet 1G.

Figure 4C:
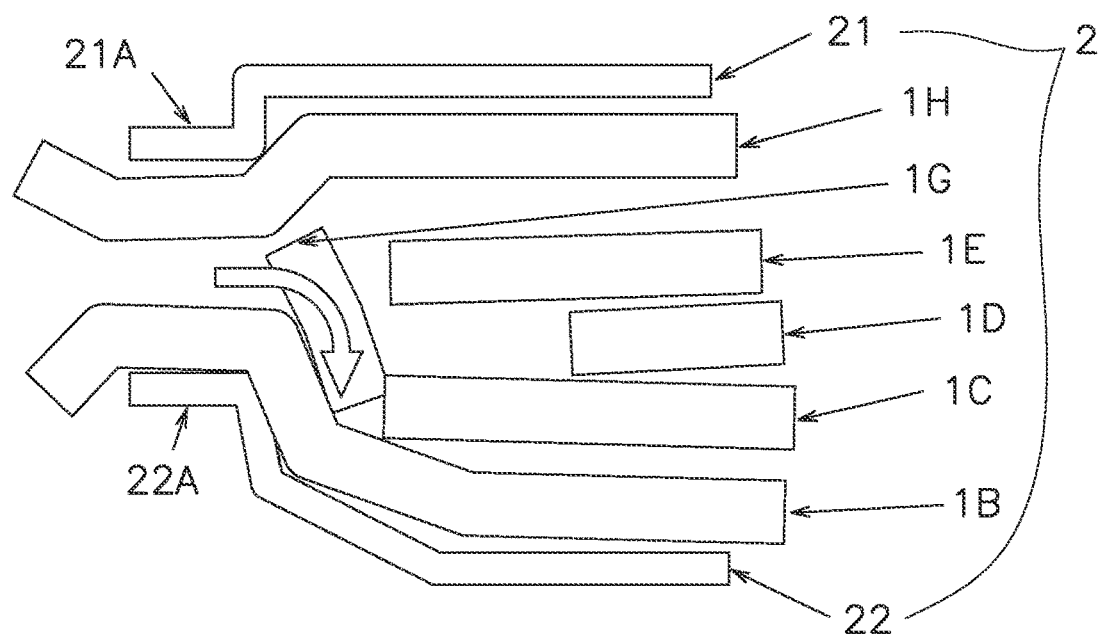
FIG. 4C is a schematic layered cross-sectional view showing an example how the elastic sheets of ELK™ are overlapped in a mold set so as to form left and right edge portions.
Figure 4D:
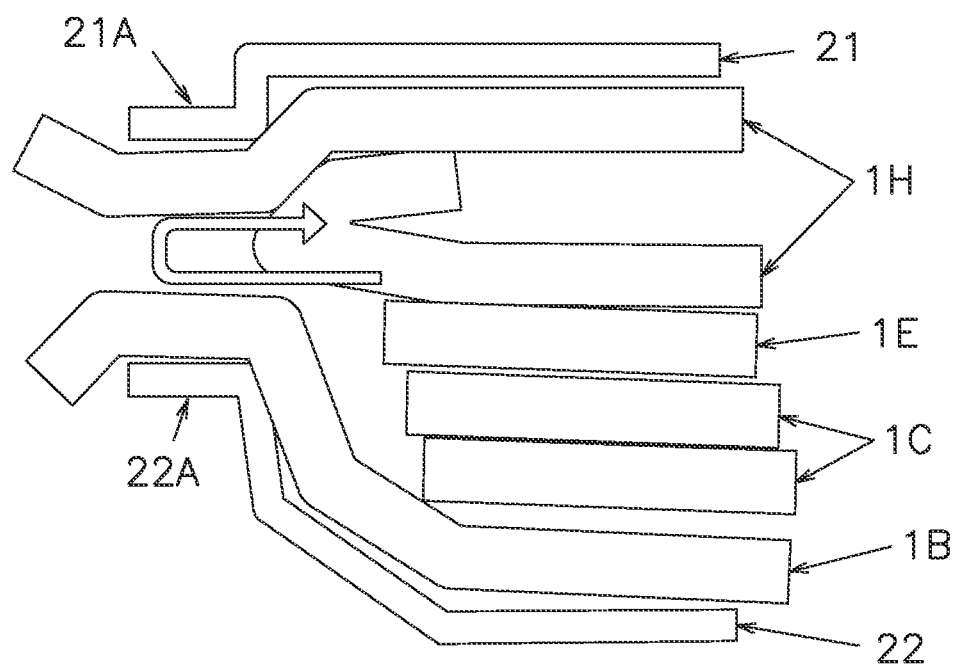
FIG. 4D is a schematic layered cross-sectional view showing another example how the elastic sheets of ELK™ are overlapped in a mold set so as to form left and right edge portions.

FIGS. 4C to 4D show detailed examples of how the elastic sheets are overlapped and molded so that the edge portions 11 are made to have a significantly higher density and stiffness than other regions.

First, in each of FIGS. 4C to 4D, the vertical-orientation elastic sheets 1H and 1B are respectively in contact with the upper mold 21 and the lower mold 22 and extend from inside to outside of the cavity of the mold set 2. Then, the jutting portions are sandwiched between the circumferential fringe portions 21A and 22A of the upper and lower molds 21 and 22, and are strongly compressed. As a result, at a time of molding, the elastic sheets 1H and 1B are fixed at the circumferential fringe portions so as not to be displaced in the horizontal direction. This facilitates that the edge portions 11 having a high and uniform density are reliably and easily produced.

As shown in FIGS. 2A to 2B, a rail-shaped protrusion is provided on an inner brink of the circumferential fringe portion 22A of the lower mold 22 while a groove is provided on the inner brink of the circumferential fringe 21A of the upper mold 21 so that the rail-shaped protrusion engages the groove. Further, the jutting portions of the elastic sheets 1H and 1B, which are strongly compressed while being heated by the circumferential fringe portions 21A and 22A, are also able to function as a kind of sealing member. Thus, even when the jutting portions of the elastic sheets 1H and 1B are sandwiched, a cavity of the mold is able to be sealed off from the outside at a time of molding so that compressed steam is contained in the cavity. Further, after molding is completed, the "burr" portions are removed so as to cut out the mold formed product of the seat cushion in the mold set 2.

In particular, the elastic sheets 1H and 1B cover the entire surface of the seat cushion 1, and are arranged respectively at uppermost and lowermost positions in the cavity of the mold set 2 when excluded are the non-vertical orientation elastic sheets 1A and 1I that are arranged only in the center portion of the seat cushion 1. Therefore, in vicinities of the edge portions 11, the elastic sheets 1C and 1E are sandwiched by the elastic sheets 1H and 1B and are thus also fixed so as not to be displaced in the horizontal direction.

In a detailed example of FIG. 4C, at a time of molding, an additional one of the elastic sheets (elastic sheet 1G) having a vertical orientation is used which is elongated and arranged so as to extend along the edge portion 11. At a time of molding, the elastic sheet 1G is partially sandwiched along the fringe of the mold set, directly by the circumferential fringes 22A and 22B of the upper and lower molds, and/or through the elastic sheets 1H and 1B from above and below which extend up to the outside of the mold set 2. Thus, the elastic sheet 1G is strongly compressed and fixed so as not to be displaced. In such a fixed state, at least at an inside (opposite to the circumferential side), the elastic sheet 1G overlaps and is fused with fringe portions of the elastic sheets 1C and 1E extending into the edge portion 11. In this manner, the edge portion 11 having an even higher density and uniform density is easily obtainable.

The elongated sheet-shaped elastic bodies 1G for increasing the density of the edge portion 11 may be arranged over the entire circumferential fringe of the seat cushion 1 or almost the entire circumferential fringe, or may be arranged at a portion thereof. In a preferred embodiment, the edge portion 11 may be arranged along left and right edges of the seat cushion 1 except for the front-end and rear-end portions. As suggested by the thick curved arrow in FIG. 4C, the elongated elastic sheet 1G may be inserted through a gap between circumferential fringe portions 21A and 22A of the upper and lower molds, just before the molds are closed after all the other elastic sheets 1B to E and H are placed inside the mold set 2. As schematically shown in FIG. 4C, the elongated elastic sheet 1G may be placed in the mold set 2 in a "standing" state, or in a state inclined by an angle not less than about 20°, not less than about 30°, or not less than about 40° to the horizontal direction.

In a detailed example of FIG. 4D, as the vertical-orientation elastic sheets 1H in contact with the upper mold 21, two separate sheets having almost the same size with each other are directly stacked together. Among the two sheets of the elastic sheets 1H, the second one from the top, which does not directly contact with the upper mold 21, includes folded-back fringe portions along the edge portions 11, or portions to become the edge portions 11. At a time of molding, such folded-back fringe portions are partially sandwiched directly by the circumferential fringes 22A and 22B of the upper and lower molds, or sandwiched by the elastic sheets 1H and 1B extending up to the outside of the mold set 2 so as to be strongly compressed and fixed so as not to be displaceable. In such a fixed state, at least at an inner side or an outer side as viewed from the fringe, the elastic sheets 1H are overlapped with end portions of the elastic sheets 1C and 1E that extend into the edge portion 11. In this manner, the edge portion 11 having an even higher and uniform density distribution is easily obtainable.

In the above, the vertical-orientation elastic sheets 1B to 1H may have the same thickness and same density while the elastic sheets having a plurality of thicknesses and densities may also be used. For example, the elastic sheets 1C to 1F and 1H, in the multi-layer or stacking structures shown in FIGS. 4A to 4B, may have same thickness and density, and may have a basis weight of about 1 kg/m², for example. Among the vertical-orientation elastic sheets, the elastic sheets 1B that are closest to the lower mold 22 or the uppermost of the seat cushion 1, may have a thickness or density less than that of the other vertical-orientation elastic sheets 1C to 1F and 1H, and may have a thickness or density at about half of that of the other vertical-orientation elastic sheets. For example, the elastic sheets 1B may have a basis weight of about 0.5 kg/m², for example. Furthermore, the thickness or density of the elongated elastic sheet 1G, which increases the density of the respective edge portion 11 shown in FIG. 4C, may be larger than that of the vertical-orientation elastic sheets 1C to 1F and 1H, or a majority of the elastic sheets. For example, the thickness or density of the elongated elastic sheet 1G is about two times of that of the majority of the elastic sheets. For example, the elastic sheet 1G may have a basis weight of 2 kg/m², for example.

In the above, the non-vertical elastic sheets 1A and 1I have been described as being arranged only in the center portion of the seat cushion 1 and being in direct contact with the upper mold 21 and the lower mold 22 respectively. Nevertheless, the non-vertical elastic sheets 1A and 1I may be arranged throughout the entire area of the seat cushion 1, or only on either of the upper and lower molds 21 and 22. Otherwise, the non-vertical elastic sheets may be arranged such that at least one of them is only in the center portion and the other of them is throughout the entire area of the seat cushion 1.

While differing densities among the regions have been explained in conjunction with FIG. 3, the densities may be set in a manner as (a) to (b) below, and may further be set in a manner as (b1) to (b2).

(a) Edge Portions 11

More than 40 kg/m³, 43 kg/m³, 45 kg/m³, or 48 kg/m³, or not less than 50 kg/m³. Along the fringe of the seat cushion 1, regions having such a density may be referred to as the edge portion 11.

At the same time, not more than 150 kg/m³, 120 kg/m³, or 100 kg/m³.

(b) Other regions excluding the edge portions 11 and their vicinities—the vicinities may be set as, for example, areas within 2 cm, 5 cm, or 8 cm from an inner fringe of the edge portions 11 that have the above density.

Less than 50 kg/m³, 48 kg/m³, 45 kg/m³, 43 kg/m³, 40 kg/m³, 38 kg/m³, or 35 kg/m³, and not less than 10 kg/m³, 15 kg/m³, or 20 kg/m³.

(b1) Operator's seating area 13, raised portion 13A, and passenger's seating area 13B 20 to 35 kg/m³, 23 to 32 kg/m³, or 25 to 30 kg/m³.

(b2) Operator's flank-side portions 12 and passenger's flank-side portions 12A 20 to 32 kg/m³, 20 to 30 kg/m³, or 23 to 26 kg/m³.

Alternatively, the density of the flank-side portions 12 and 12A may be 70 to 97%, 80 to 95%, or 83 to 93% of that of the operator's seating area 13.

In the above-described explanation relating to density distribution, the operator's seating area 13, the raised portion 13A, and the passenger's seating area 13B have been described as having substantially the same density, but these regions may have a plurality of densities as needed or appropriate. For example, the density of the raised portion 13A may be set to 103% to 110% or 103% to 108% of the density of the operator's seating area 13. If so, the passenger's seating area 13B may have the same density as the raised portion 13A or as the operator's seating area 13.

In a preferred embodiment, the fibers and conditions (1) to (8) as below may be used to produce a sheet-shaped elastic body, which is the elastic sheet of ELK™.

(1) Fineness of skeletal fibers and fusible fibers: 1 to 200 dtex.

(2) Structure of skeletal fibers: Solid, hollow, irregular cross section, sheath core (core sheath), eccentric sheath core structure, or side-by-side fiber's cross section. Fibers are two-dimensionally crimp-processed in a zigzag form or three-dimensionally crimp-processed in a spiral form or in an omega-shaped form.

(3) The skeletal fibers and cores of the fusible fibers: staples of polyethylene terephthalate, polytrimethylene terephthalate, polybutylene terephthalate, polyhexamethylene terephthalate, polytetramethylene terephthalate, poly-1,4-dimethylcyclohexane terephthalate, or polypivalolactone; or a copolymer polyester obtained by modifying any of the above polyester polymers with a third component; or a mixed-staples wadding including of any of the above staples; or composite fibers including of any two among the above polyester polymer components.

(4) Sheath resin (fusible resin) of the fusible fibers: thermoplastic polyester/ether elastomer. More specifically, the elastomer may be a polyester-ether-based block copolymer having a copolymerization ratio (weight ratio) of a hard segment to a soft segment at 95:5 to 20:80; the hard segment is a polyester, in which diacid components is mainly formed by 40 to 100 mol % of terephthalic acid and 0 to 50 mol % of isophthalic acid while a main glycol component is 1,4-butanediol; and the soft segment is a polyether, and is poly (alkylene oxide) glycol having an average molecular weight of 400 to 5000.

(5) Intrinsic viscosity of the sheath resin (fusible resin): 0.8 to 1.7 dl/g, especially 0.9 to 1.5 dl/g.

(6) Core to sheath area ratio in cross section of the fusible fiber: 20/80 to 80/20.

(7) Melting point of sheath resin (fusible resin): 40° C. or more lower than the melting point of the skeletal fiber and the core resin. When the skeletal fibers and the cores are made of polyethylene terephthalate (melting point 250° C. to 270° C.), the melting point of the sheath resin is, for example, 120° C. to 200° C. or 130° C. to 180° C.

(8) Mixing weight ratio of the skeletal fibers to the fusible fiber: 90/10 to 10/90.

The thermoplastic elastomer of the sheath (fusible resin) of the fusible fibers have characteristics (9) to (10) below in a preferred embodiment when a sheet tensile test is made on the thermoplastic elastomer according to: JIS K6273: 2018 "Vulcanized rubber and thermoplastic rubber—How to determine tensile permanent strain, elongation rate and creep rate"; and JIS K6251: 2017 "Vulcanized rubber and thermoplastic rubber—How to determine tensile properties".

(9) Recovery rate from (300±10) % elongation (100–[constant elongation tensile permanent strain] (%)): 60% or more, preferably 70% or more, for example 70 to 90%.

(10) Elongation at a time of breakage: 500% or more, preferably 800% or more, for example, 800 to 1200%.

In a preferred embodiment, molding from the elastic sheet with the mold set may be performed under condition (11) below while the molded seat cushion has the following characteristics (12) to (14).

(11) Heating during molding: By introducing pressurized steam into the mold set at once, the molds are rapidly heated to a temperature 3° C. to 10° C. or 3° C. to 8° C. higher than the melting point of the sheath of the fusible fiber and then kept at this temperature. For example, the pressurized steam is at a pressure in a range of 5 to 20 atm (0.5 to 2 Mpa).

(12) Density distribution range: 15 to 150 kg/m³. In the edge portions, 45 to 120 kg/m³. Areas other than the edge portions, 15 to 40 kg/m³.

(13) Compressive hardness (JIS K 6400-2: 2012) for areas excluding the edge portions and their vicinities.

When measured with a compression plate size of 200 mm diameter (φ) and a compression speed of 100 mm/min, the pressurizing side load at 40% constant compression is 200 to 500 N or 300 to 400 N. Pressurized side load at 25% constant compression is 400 to 800 N or 500 to 700 N.

(14) Durometer "A" hardness (JIS K 7215: 1986) for the edge portions.

Durometer "A" hardness according to JIS K 7215 "Plastic durometer hardness test method" is approximately 25 to 75 (A25 to A75).

The durometer "A" hardness is about 75 at a density of 100 kg/m³ and about 25 at a density of 50 kg/m³. Meanwhile, the above-described compression hardness (JIS K 6400-2: 2012) for the portions having a density of 100 kg/m³, when measured, is presumed to greatly exceed 1000 N.

Examples

The seat cushion 1 having the layered structures shown in FIGS. 4A and 4C was manufactured.

The elastic sheets 1A to 1I used for manufacturing are all commercial products ELK™ of Teijin Frontier Co., Ltd., or vertical-orientation non-woven fabrics, which are incorporated in various products manufactured and sold by Teijin Frontier Co., Ltd.

For the non-vertical-orientation elastic sheets 1A and 1I, a non-woven fabric of ELK™ having a basis weight of 0.15 kg/m² was used; and for the vertical-orientation elastic sheets 1B to 1H, vertical-orientation fabrics having a basis weight of 0.45 kg/m² were used. For obtaining each of the elastic sheets 1C to 1F and 1H before molding, two of the elastic sheet products were overlapped and slightly compressed to have a basis weight of about 1 kg/m²; and for obtaining each of the elastic sheets 1B before molding, only one elastic sheet product was slightly compressed to have a basis weight of about 0.5 kg/m². For obtaining the elongated sheet-shaped elastic body 1G for increasing the density of the edge portion 11, two of the elastic sheet products were overlapped and slightly compressed to have a basis weight of about 2 kg/m². The vertical-orientation elastic sheets 1B to 1H used were obtained by accordion folding a non-woven fabric of ELK™, which is same or similar as that used for the non-vertical elastic sheets 1A and 1I.

As the elastic sheets 1A to 1I used for manufacturing by molding, those having the manufacturing conditions or characteristics as described in (1) to (10) below were used.

(1) Fineness of skeletal fibers: 13 dtex. Fineness of the fusible fibers: 6.6 dtex.

(2) Structure of skeletal fibers: hollow in cross section and three-dimensionally crimp-processed to have three-dimensional Ω-shaped crimps.

(3) Resin forming the skeletal fibers and the core of the fusible fibers: polyethylene terephthalate.

(4) Sheath resin (fusible resin): thermoplastic polyester/ether elastomer. More specifically, the elastomer is a block copolymer having polybutylene-based terephthalate modified by copolymerizing isophthalic acid, as a hard segment, and having polytetramethylene glycol as a soft segment.

(5) Intrinsic viscosity of sheath resin (fusible resin): 1.15 dl/g.

(6) Core-sheath area ratio in cross section of the fusible fibers:core/sheath=60/40.

(7) Melting point of the sheath resin (fusible resin): 155° C.

(8) Mixing weight ratio of skeletal fibers to fusible fibers: 30/70.

The thermoplastic elastomer that forms the sheath resin (fusible resin) of the fusible fibers have characteristics (9) to (10) below when a sheet-shaped tensile test is performed on the thermoplastic elastomer according to JIS K6273: 2018 "Vulcanized rubber and thermoplastic rubber".

(9) Recovery rate from (300±10) % elongation: 70-900.

(10) Elongation at break: 1000%.

Molding from the elastic sheets was performed under conditions (11) below. The seat cushion as thus molded had the following characteristics (12) to (14).

(11) Heating during molding: By introducing pressurized steam at 10 atm into the mold set 2 at once, the molds were heated to 160° C. and held in this state for a while.

(12) Density distribution range: 20 to 100 kg/m³. The range is: 50 to 100 kg/m³ for the edge portions 11; 26-28 kg/m³ for the operator's seating area 13 and the passenger's seating area 13B; 27-29 kg/m³ for the raised portion 13A; and 26-28 kg/m³ for the operator's flank-side area 12 and the rear flank-side area 12A.

(13) Hardness (JIS K6400-2: 2012) measurement

When the seat cushion before attaching the skin was used as it was as a test piece and measured at a compression plate size of 200 mm diameter (p) and a compression speed of 100 mm/min, the results shown in Table 1 below were obtained.

TABLE 1

| Initial thickness mm | Hysteresis loss | Pressurized side load [N] | |
|---|---|---|---|
| | | 25% compression | 40% compression |
| 107.48 | 45.8 | 355 | 599 |

Measuring position: rear of the operator's seating area 13,
Measuring method: compression plate size 200 mm diameter (φ), compression speed 100 mm/min

(14) Evaluation of Drainage

The time required for drainage was 24 hours when evaluated by a drainage test described below.

Whole surface of the seat cushion 1 was covered with a support base as a lid and a skin which was fixed to the support base. The skin is made of a non-permeable material (raw fabric) obtained by immersing a knitted polyester (PET) fabric in a polyurethane resin before curing. The skin includes a plurality of skin pieces which have been cut out from a flat raw fabric and are sewn to be joined at portions corresponding to ridge lines and valley lines of the seat cushion 1. The skin includes through holes for passing strings and fastening the skin, along a line of the notches 14 on a center portion of the seat cushion 1. The strings were passed through the through holes so that the skin, the seat cushion, and the support base are fastened together. The seat cushion 1 assembled with the support board and the skin, which has a plurality of fastening and sewing holes, was completely immersed in water for 24 hours. Then, the seat cushion 1 was pulled out from the water and placed on a platform scale, and the weight change over time was monitored so as to determine a time required for soaked-in water to be decreased to 10% of that at a time of removal from the water.

It took two hours for the soaked-in water to decrease to 80% of that at the time of removal. Meanwhile, after 120 hours (5 days) from removal from the water, the weight measured on the platform scale returned to the weight before the immersion in the water, and it was confirmed that the soaked-in water was almost completely drained.

As a comparative example, a common seat cushion made of a soft urethane resin foam (current product of "Yamaha FX") was used and subjected to the drainage test as described above. Then, even after 144 hours (6 days), the amount of the soaked-in water decreased only to 14% of that at the time of removal. Further, even after 30 days of being left on the platform scale, almost no weight change was observed, and thus no further drainage was confirmed.

The seat cushion of this comparative example has almost a uniform density and stiffness. Therefore, at a time attaching the skin to the seat cushion, a measure to prevent the edge portions from being pulled inward is necessary. Thus, it was necessary to set a fastening method in a way such that a force of pulling inward is not applied to the edge portions. For example, as indicated in the left end portion of FIG. 1A, it was necessary to separately prepare a skin piece covering a non-fringe upper surface portion and a skin piece covering end surfaces of the edge portions and sew them together.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A seat cushion for a saddle-riding vehicle, the seat cushion comprising:
an edge portion;
a three-dimensional fiber structure including core-sheath fusible fibers and skeletal fibers thermally fused at intersections thereof; wherein
sheaths of the core-sheath fusible fibers are made of a thermoplastic elastomer and form a bulging portion at each of the fused intersections;
the skeletal fibers and cores of the core-sheath fusible fibers are made of a non-elastomer resin;
the skeletal fibers are crimp-processed bulky fibers;
a fineness of the skeletal fibers and a fineness of the core-sheath fusible fibers are in a range of 1 to 200 dtex;
the seat cushion includes a layered structure including a plurality of layers fused together, and each of the plurality of layers includes the three-dimensional fiber structure; and
the seat cushion has a density distribution based on regional variations of the layered structure in the seat cushion and has a stiffness distribution that depends on the density distribution.

2. The seat cushion according to claim 1, wherein
at least one of the plurality of layers extends to a circumferential fringe of the seat cushion; and
the plurality of layers include a plurality of layers with a vertical orientation in which the fibers are oriented in a thickness direction of the plurality of layers.

3. The seat cushion according to claim 1, wherein
the edge portion is provided along at least a portion of a circumferential fringe of the seat cushion, and a thickness of the edge portion is less than a thickness of other regions of the seat cushion, or is tapered toward the circumferential fringe.

4. The seat cushion according to claim 1, wherein
a density and a stiffness at the edge portion are higher than a density and a stiffness at other regions of the seat cushion, and the other regions of the seat cushion include at least two regions having different densities with respect to each other.

5. The seat cushion according to claim 4, wherein
a density at the regions other than the edge portion is in a range of 20 to 35 kg/m$^3$;
the at least two regions include an operator's seating area supporting and retaining an operator from below, a side portion corresponding to an inward side of the operator's legs, or a raised portion at a rear of operator's seating area; and
a density at the operator's seating area is less than a density at the side portion or a density at the raised portion.

6. The seat cushion according to claim 1, wherein the edge portion has a density of more than 40 kg/m$^3$ and defines a shape-retaining framework for the seat cushion.

7. The seat cushion according to claim 1, wherein a density of regions of the seat cushion other than the edge portion is less than 40 kg/m$^3$.

8. The seat cushion according to claim 1, wherein the skeletal fibers are hollow fibers crimped in a curved shape, and the core-sheath fusible fibers have a fineness smaller than a fineness of the skeletal fibers.

9. The seat cushion according to claim 1, wherein the plurality of layers include at least one layer having a non-vertical orientation.

10. The seat cushion according to claim 1, wherein the plurality of layers include a plurality of vertical-orientation layers, each of which also having a horizontal orientation, and directions of the horizontal orientation of the plurality of vertical-orientation layers are orthogonal or parallel with each other.

11. The seat cushion according to claim 1, wherein the plurality of layers include at least one of c1 to c2, or at least one of c1 to c3:
(c1) a layer extending over an entire area of the seat cushion;
(c2) a layer extending from an operator's seating area to a raised portion at a rear of the operator's seating area; and
(c3) a layer provided only in the raised portion at the rear of the operator's seating area.

12. The seat cushion according to claim 1, wherein a time required for drainage evaluated by a drainage test is 36 hours or less; and
the drainage test includes:
the seat cushion is entirely covered by a support base as a lid and a skin fixed to the support base, the skin is made of a non-permeable seat material provided with a plurality of string-passing through holes or sewing holes;
the seat cushion with the skin and the support base is completely immersed in water for 24 hours and subsequently removed; and
a weight decline after being removed from the water is observed so as to determine a time required for water in the seat cushion to be decreased to 10% of that at a time of the removal.

13. A saddle-riding vehicle comprising:
the seat cushion according to claim 1.

14. The saddle-riding vehicle according to claim 13, further comprising:
a skin that covers the seat cushion;
a support base on which the seat cushion is provided; and
a string or a thread that is at least partially used to fasten the skin to the support base; wherein
the support base functions as a flip-up lid for a machine room or a storage room of the saddle-riding vehicle.

15. The saddle-riding vehicle according to claim 13, wherein the saddle-riding vehicle is a personal watercraft or a motorcycle.

* * * * *